Feb. 4, 1947. C. P. POTTER Re. 22,839

CALENDAR

Original Filed July 31, 1944

Inventor
C. P. Potter
By Gareth E. Maybee
Atty.

Reissued Feb. 4, 1947

Re. 22,839

UNITED STATES PATENT OFFICE 22,839

CALENDAR

Charles P. Potter, Toronto, Ontario, Canada

Original No. 2,393,869, dated January 29, 1946, Serial No. 547,327, July 31, 1944. Application for reissue October 9, 1946, Serial No. 702,108. In Canada July 31, 1943.

8 Claims. (Cl. 283—2)

This invention relates to calendars, particularly to calendars of the type commonly known in the trade as the co-operative type, i. e. the type that are purchased by large manufacturers or distributors whose products are sold from one end of the country to the other by many (often thousands) of dealers. The manufacturer or distributor buys these calendars in large quantities. Each calendar bears a picture or ornamental design, dates for the months of the year, and a space for imprinting the dealer's name, address etc. A certain number of the calendars are imprinted with the dealer's name and supplied to the dealer for distribution to his customers. Sales of such calendars of a given design run into the millions. They are therefore a mass production proposition and any saving that may be effected in material or in any part of the process of manufacture is vitally important to the producer of the calendars as it may easily mean the difference between loss or profit. Moreover a slight difference in cost per unit is important to the purchaser of the calendars since it may determine whether or not the calendars may be purchased within the money available for the purpose.

The object of the invention is to provide a calendar which will compare favourably with conventional co-operative calendars now used, but which can be made for less than the cost of the cheapest conventional calendar now on the market.

This object has been attained by means of a calendar which is made of a single strip of light weight paper that can be automatically printed, folded, and punched, and which does not require tipping on of pictures, calendar pads, wire stitching, tinning, or assembling. The calendar which I have devised not only saves paper and labour, yet displays several pictures or ornamental designs for each year as compared with the single picture on an ordinary calendar.

An important feature of the applicant's device is the provision of at least one fold or leaf of greater area than another leaf of the calendar to provide an extension for printing the dealer's name thereon which will be visible at all times. Printing of the dealers' names represents a major cost in co-operative calendar production, inasmuch as sometimes thousands of dealers' names have to be set up separately and individually imprinted on the already printed calendar. According to this invention all imprinting may be done at the same time that the calendar is being run through the press. A further advantage is that the calendars are printed on large sheets, a number at a time, and then cut into strips.

Figure 1:
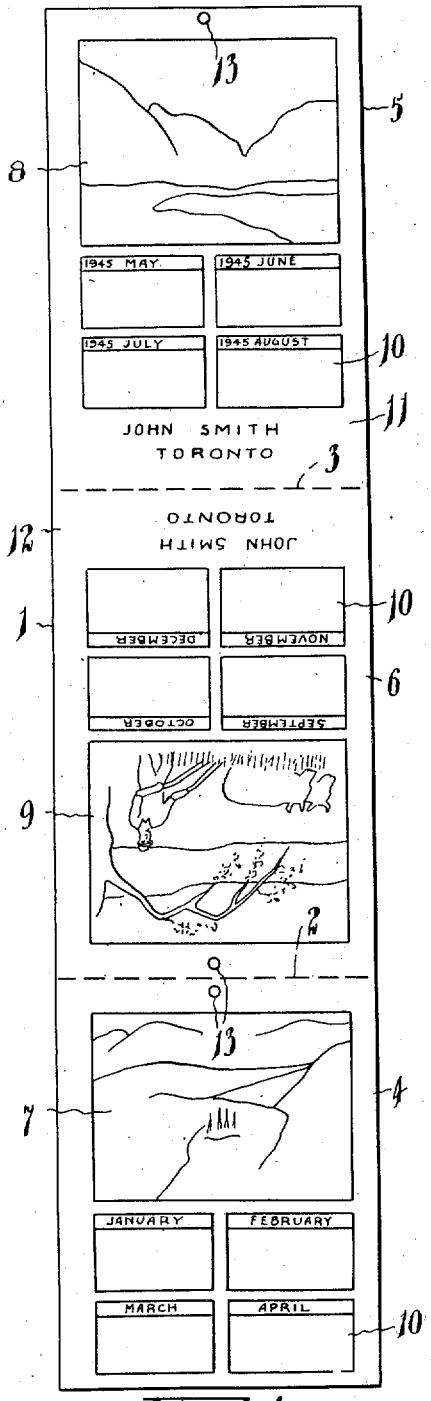
Figure 2:
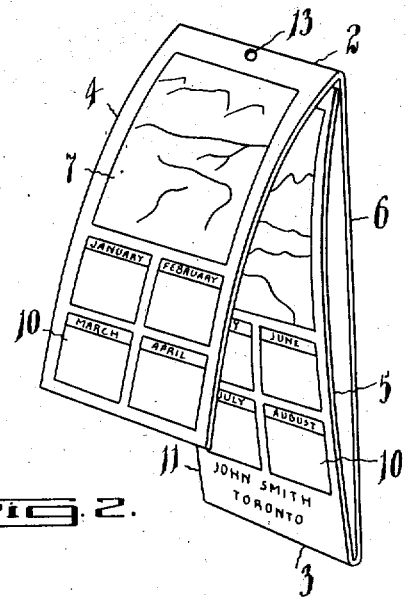
Figure 3:
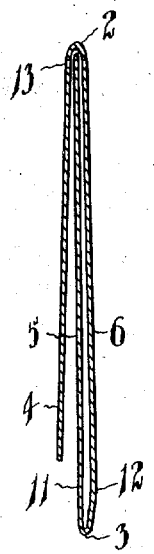
Figure 4:
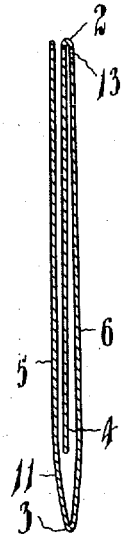

The invention is hereinafter more particularly described and illustrated by way of example in the annexed drawing in which:

Figure 1 is a plan view of my calendar in its extended form;

Figure 2 a perspective side view of the calendar folded to expose the months of January, February, March and April;

Figure 3 a longitudinal section of the calendar arranged as shown in Figure 2;

Figure 4 a longitudinal section of the calendar arranged to display on the left side the months of May, June, July and August, and on the right side the months of September, October, November and December.

In the drawing like numerals of reference indicate corresponding parts in the different figures.

As illustrated in Figures 1 to 4, the calendar comprises a strip 1 of paper which is adapted to be folded along the lines 2 and 3 to form the leaves 4, 5 and 6. Multi-coloured pictures 7, 8 and 9, or other suitable display matter, may be lithographed or printed on the leaves which also bear calendar indicia 10. It will be noted that all the pictures and indicia are on one side only of the strip 1 and that a picture and indicia are on each of the leaves. Also, that the two folds are made so that the leaves 4 and 5 fold inwardly to overlie one another on the blank side of the leaf 6 and that each leaf 4 and 5 folds only one way instead of being folded first in one direction and then in the other. By reason of this folding, the blank side of the strip 1 is never exposed to view when the calendar is properly folded and hung on a wall.

The various multi-coloured pictures may thus be printed or lithographed simultaneously for the complete calendar and during this process the complete calendar indicia may also be printed or lithographed. By performing all these operations simultaneously, a great saving in time and thus in cost is effected. The time saved is not only operators' time but machine time which results in many economies such as floor space, overhead expenses and power.

Preferably the calendar covers a period of one year and therefore each leaf has four sets 10 of dates representing different months thereon.

The general practice in producing large orders of calendars for large companies having a number of local dealers selling their goods or services at various places throughout the country is for the company to order the calendars and have a certain proportion of them delivered to each dealer with the personal, firm or corporate name of said dealer, address and any other desired information thereon for distribution to the dealer's customers. The above information is printed in the spaces 11 and 12 below the calendar indicia 10 on the leaves 5 and 6. The leaf 4 is shorter than the leaves 5 and 6 whereby the said information at the bottom of the leaf 5 will be displayed when the short leaf 4 is in use. By employing a short leaf, not only a saving in stock is effected but a third imprint is avoided which effects a great saving in the cost of producing a large number of calendars.

The different dealers' names, etc., can be printed simultaneously with the other printing by stopping the machine after the desired quantity for one dealer has been printed and substituting different type in duplicate for another dealer. Alternatively, it is possible to produce the calendars first and subsequently fill in the spaces 11 and 12 in the desired number of calendars with each dealer's name etc.

The leaves have one set only of registered holes 13 for hanging the calendar. The holes in the leaves 4 and 6 being adjacent one another at opposite sides of the fold 2, while the hole in the leaf 5 is adjacent the end of the strip remote from the fold 2. The display matter such as the picture 9, the calendar indicia 10 and the information in the space 12 on the intermediate leaf 6 are upside down or reversed relative to the pictures 7 and 8 and the calender indicia, etc., on the leaves 4 and 5 so that when the leaves 4 and 5 are folded inwardly the pictures 7, 8 and indicia 10 thereon will be positioned to agree with the picture 9 and indicia 10 on the leaf 6. At the same time the picture 9, indicia 10 and the information in the space 12 are faced oppositely the pictures 7, 8, indicia 10 and information in the space 11 on the leaves 5 and 4.

The strip 1 is folded on the lines 2 and 3 so that the leaf 5 lies between the leaves 4 and 6 and thus all the printing on the leaves will be from top to bottom thereon. The leaf 4 is thus exposed to display its picture and calendar indicia. At the same time the information in the space 11 at the bottom of leaf 5 will be displayed. When the period covered by the calendar indicia on leaf 4 has elapsed, the calendar is removed from the hook engaging the registered holes 13 and the leaf 4 is swung to a position between the leaves 5 and 6. The picture 8 and other indicia on leaf 5 is now displayed. By turning the calendar back to front on its hook, the picture 9 and other indicia on leaf 6 will be displayed.

Since the calendar is folded to form three leaves 4, 5 and 6 each leaf tends to support the other leaves which results in the calendar hanging evenly and flat without any tendency to bow or warp when it is hung on a wall. Thus thin inexpensive lightweight paper may be used instead of heavy expensive stock to further reduce the cost of my calendars.

It will be distinctly understood that various modifictions may be effected without departing from the spirit of my invention as defined by the claims hereof.

What I claim as my invention is:

1. A calendar comprising a strip of material foldable intermediate its ends to form three leaves, each leaf having a different multi-coloured ornamental design and a set of calendar indicia thereon, the calendar indicia on the three leaves representing a total of at least twelve months, two adjacent leaves being longer than the third, and the design and calendar indicia on one of the longer leaves being oppositely disposed relative to the design and calendar indicia on the other of the longer leaves and each of the longer leaves having informational indicia therebeneath, the informational indicia on at least one leaf being displayed in each folded position of the calendar, said ornamental design, calendar indicia and informational indicia being printed on one side only of the strip.

2. A calendar comprising a strip of material foldable intermediate its ends to form three leaves, each leaf having a different multi-coloured ornamental design and a set of calendar indicia thereon, the calendar indicia on the three leaves representing a total of at least twelve months, two adjacent leaves being longer than the third, and the design and calendar indicia on the two longer leaves being oppositely disposed and each of the longer leaves having informational indicia therebeneath, the informational indicia on at least one leaf being displayed in each folded position of the calendar, said ornamental design, calendar indicia and informational indicia being printed on one side only of the strip, and holes in the upper end of each leaf adapted to register with each other in the various folded positions of the calendar to receive a peg on which to hang the calendar with the desired indicia displayed.

3. A calendar comprising a strip of material foldable intermediate its ends to form three leaves, each leaf having a multi-coloured ornamental design and a set of calendar indicia thereon, the calendar indicia on the three leaves representing a total of at least twelve months, at least one leaf being longer than the third and having informational indicia printed beneath the calendar indicia thereon, the design and calendar indicia on said longer leaf being oppositely disposed relative to the design and calendar indicia on an adjacent leaf, and holes in the leaves adapted to register with each other in the various folded positions of the calendar to receive a peg on which to hang the calendar with the desired indicia displayed.

4. A calendar comprising a strip of material foldable intermediate its ends to form at least three leaves, each leaf having a different multi-coloured ornamental design and a set of calendar indicia thereon, the calendar indicia on the leaves representing a total of at least twelve months, two adjacent leaves being longer than the third, and the design and calendar indicia on one of the longer leaves being oppositely disposed relative to the design and calendar indicia on the other of the longer leaves and each of the longer leaves having informational indicia therebeneath, the informational indicia on at least one leaf being displayed in each folded position of the calendar, said ornamental design, calendar indicia and informational indicia being printed on one side only of the strip.

5. A calendar comprising a strip of material foldable intermediate its ends to form at least three leaves, each leaf having a different multi-coloured ornamental design and a set of calendar indicia thereon, the calendar indicia on the leaves representing a total of at least twelve months, two adjacent leaves being longer than the third, and the design and calendar indicia on the two longer leaves being oppositely disposed and each of the longer leaves having informational indicia therebeneath, the informational indicia on at least one leaf being displayed in each folded position of the calendar, said ornamental design, calendar indicia and informational indicia being printed on one side only of the strip, and holes in the upper end of each leaf adapted to register with each other in the various folded positions of the calendar to receive a peg on which to hang the calendar with the desired indicia displayed.

6. A calendar comprising a strip of material foldable intermediate its ends to form at least three leaves, each leaf having a multi-coloured ornamental design and a set of calendar indicia thereon, the calendar indicia on the leaves representing a total of at least twelve months, at least one leaf being longer than the third and having informational indicia printed beneath the calendar indicia thereon, the design and calendar indicia on said longer leaf being oppositely disposed relative to the design and calendar indicia on an adjacent leaf, and holes in the leaves adapted to register with each other in the various folded positions of the calendar to receive a peg on which to hang the calendar with the desired indicia displayed.

7. A calendar comprising a strip of material foldable intermediate its ends to form at least three leaves, each leaf having a different multi-coloured ornamental design and a set of calendar indicia thereon, the calendar indicia on the leaves representing a total of at least twelve months, two leaves being longer than the third, and the design and calendar indicia on one of the longer leaves being oppositely disposed relative to the design and calendar indicia on the other of the longer leaves and each of the longer leaves having informational indicia therebeneath, the informational indicia on at least one leaf being displayed in each folded position of the calendar, said ornamental design, calendar indicia and information indicia being printed on one side only of the strip.

8. A calendar comprising a strip of material foldable intermediate its ends to form at least three leaves, each leaf having a different multi-coloured ornamental design and a set of calendar indicia thereon, the calendar indicia on the leaves representing a total of at least twelve months, two leaves being longer than the third, and the design and calendar indicia on the two longer leaves being oppositely disposed and each of the longer leaves having informational indicia therebeneath, the informational indicia on at least one leaf being displayed in each folded position of the calendar, said ornamental design, calendar indicia and informational indicia being printed on one side only of the strip, and holes in the upper end of each leaf adapted to register with each other in the various folded positions of the calendar to receive a peg on which to hang the calendar with the desired indicia displayed.

CHARLES P. POTTER.